(12) United States Patent
Wang et al.

(10) Patent No.: US 12,326,195 B2
(45) Date of Patent: Jun. 10, 2025

(54) CONTROL VALVE

(71) Applicant: ZHEJIANG SANHUA AUTOMOTIVE COMPONENTS CO., LTD., Zhejiang (CN)

(72) Inventors: Lixin Wang, Zhejiang (CN); Long Lin, Zhejiang (CN); Yun Wang, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 64 days.

(21) Appl. No.: 18/555,529

(22) PCT Filed: Apr. 15, 2022

(86) PCT No.: PCT/CN2022/087036
§ 371 (c)(1),
(2) Date: Oct. 15, 2023

(87) PCT Pub. No.: WO2022/218408
PCT Pub. Date: Oct. 20, 2022

(65) Prior Publication Data
US 2024/0035580 A1 Feb. 1, 2024

(30) Foreign Application Priority Data
Apr. 16, 2021 (CN) .......................... 202110412417.9

(51) Int. Cl.
*F16K 11/08* (2006.01)
*F16K 11/085* (2006.01)

(52) U.S. Cl.
CPC .............................. *F16K 11/0856* (2013.01)

(58) Field of Classification Search
CPC ................................................... F16K 11/0856
See application file for complete search history.

(56) References Cited

U.S. PATENT DOCUMENTS

2011/0272049 A1 11/2011 Jorgensen et al.
2017/0168510 A1* 6/2017 Ye ........................... G05D 7/01
(Continued)

FOREIGN PATENT DOCUMENTS

| CN | 103791114 A | 5/2014 |
| CN | 106382382 A | 2/2017 |

(Continued)

OTHER PUBLICATIONS

International Search Report for PCT/CN2022/087036 mailed Jul. 1, 2022, ISA/CN.

*Primary Examiner* — Kevin R Barss
(74) *Attorney, Agent, or Firm* — Yue (Robert) Xu; Apex Attorneys at Law, LLP

(57) ABSTRACT

A control valve is provided, which comprises a valve body and a valve element. The valve element can be driven to rotate, the valve element is provided with an external communicating cavity and a first cavity, and the valve element comprises a first partition plate, a first valve element shaft and a first reinforcing rib; the first reinforcing rib comprises a first end portion, a second end portion and a first main body portion in a height direction of the valve element and the first main body portion is connected between the first end portion and the second end portion, and there is a height difference between the first end portion and the second end portion.

20 Claims, 10 Drawing Sheets

(56) References Cited

U.S. PATENT DOCUMENTS

2021/0270383 A1 9/2021 Qiu et al.
2021/0332911 A1 10/2021 Ma

FOREIGN PATENT DOCUMENTS

| CN | 109695744 | A | 4/2019 |
| CN | 110630729 | A | 12/2019 |
| CN | 111473131 | A | 7/2020 |
| GB | 2582051 | A | 9/2020 |
| WO | 2020143425 | A1 | 7/2020 |

\* cited by examiner

CONTROL VALVE

This disclosure is a national phase application of PCT international patent application PCT/CN2022/087036 filed on Apr. 15, 2022 which claims the priority to Chinese Patent Application No. 202110412417.9, titled "CONTROL VALVE", filed on Apr. 16, 2021 with the China National Intellectual Property Administration, which are incorporated herein by reference in its entirety.

FIELD

The present disclosure relates to the technical field of fluid control, and in particular to a control valve.

BACKGROUND

Generally, a valve core of a control valve is driven by a driving member to rotate to realize the control of fluid in multiple flow paths by the control valve, and therefore, the structural strength of the valve core is crucial to the stability of the operation of the control valve.

SUMMARY

The purpose of the present disclosure is to provide a control valve that can improve the structural strength of the valve core and improve the stability of the operation of the control valve.

A control valve is provided according to the embodiments of the present disclosure. The control valve includes a valve body and a valve core. The valve body includes a side wall portion, the control valve has a valve chamber, the side wall portion forms at least part of a peripheral wall of the valve chamber, the valve core is configured to be driven to rotate and at least part of the valve core is arranged in the valve chamber, the valve core has outer communication chambers and a first chamber, the outer communication chambers are distributed on an outer peripheral side of the first chamber, the valve core includes a first partition and a first valve-core shaft, the first partition is located between the outer communication chambers and the first chamber, the first valve-core shaft is located on an inner peripheral side of the first partition and a gap is provided between the first valve-core shaft and the first partition, the first chamber includes the gap between the first valve-core shaft and the first partition, and the control valve further includes a first reinforcing rib, and the first reinforcing rib is located in the first chamber; and the first reinforcing rib extends around an axis of the first valve-core shaft, the first reinforcing rib includes a first end portion, a second end portion, and a first main body portion, the first main body portion is connected between the first end portion and the second end portion, and there is a height difference between the first end portion and the second end portion along a height direction of the valve core.

According to the control valve provided by the embodiments of the present disclosure, the control valve has the outer communication chambers and the first chamber. The thicknesses of the control valve at various positions tend to be the same by providing the first chamber, to prevent deformation caused by uneven wall thickness of the control valve during the manufacturing process. The control valve according to the embodiments of the present disclosure further includes the first reinforcing rib located in the first chamber, the first reinforcing rib extends around the axis of the first valve-core shaft, and there is a height difference between the first end and the second end of the first reinforcing rib. The first reinforcing rib is of a spiral structure, which can improve the anti-twist strength of the valve core and reduce the twist deformation of the valve core during rotation, thereby alleviating the fluid leakage problem of the control valve caused by twist deformation and improving the stability of the operation of the control valve.

DETAILED DESCRIPTION OF EMBODIMENTS

Features and exemplary embodiments of various aspects of the present disclosure are described in detail below. In order to make the purposes, technical solutions and advantages of the present disclosure clearer, the present disclosure is further described in detail below in conjunction with the drawings and specific embodiments. In this specification, relational terms such as "first" and "second" are only used to distinguish one element from another element with a same name, and do not necessarily require or imply any actual relationship or order between the elements.

Figure 1:
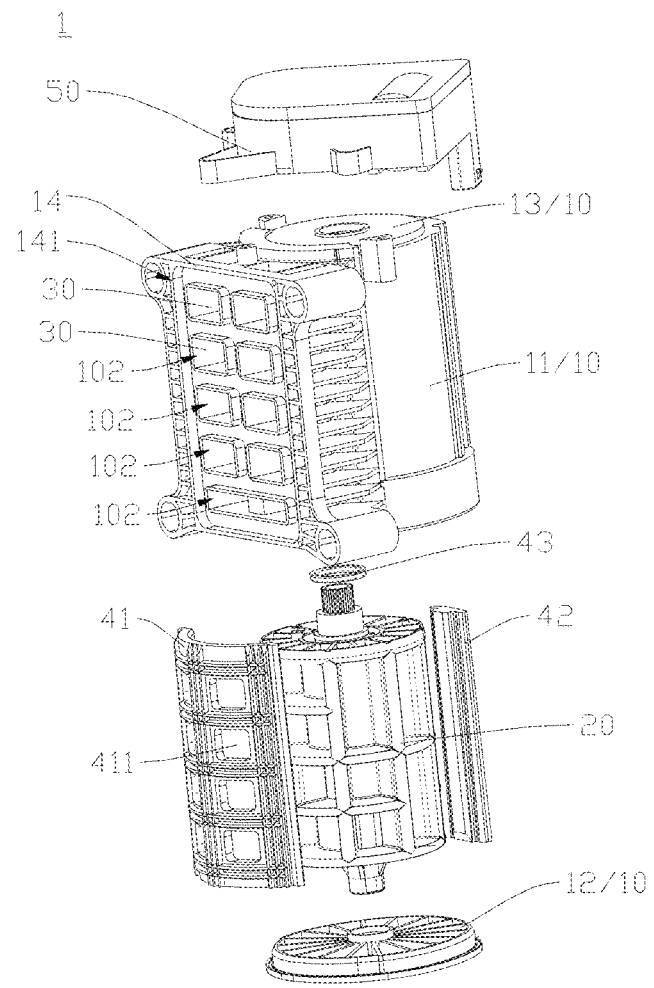
FIG. 1 is a schematic exploded structural view of a control valve according to an embodiment of the present disclosure.
Figure 2:
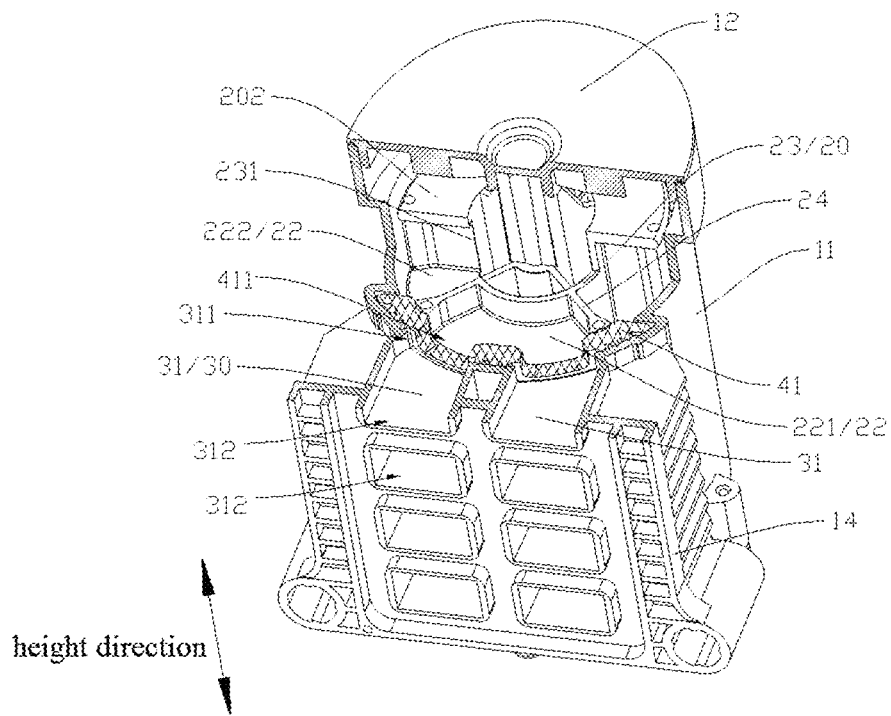
FIG. 2 is a partial cross-sectional view of the control valve shown in FIG. 1 at a first position.
Figure 3:
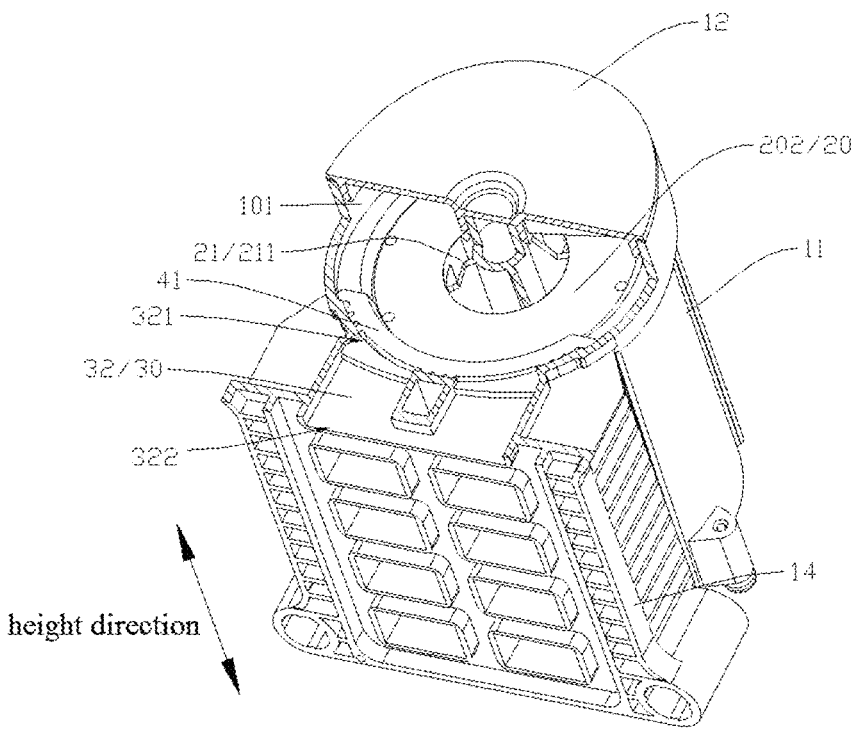
FIG. 3 is a partial cross-sectional view of the control valve shown in FIG. 1 at a second position.

As shown in FIGS. 1 to 3, a control valve 1 is provided according to an embodiment of the present disclosure. The control valve 1 includes a valve body 10, a valve core 20, and a first seal 41. The valve body 10 includes a side wall portion 11, and the control valve 1 has a valve chamber 101. The side wall portion 11 is a peripheral wall of the valve chamber 101 or at least part of the peripheral wall of the valve chamber 101. The first seal 41 is arranged between the valve core 20 and the side wall portion 11 along a radial direction of the valve core 20, and the valve core 20 is able to be driven to rotate. The control valve 1 may further include a driving device 50 and a sealing ring 43. The driving device 50 includes a driving element, and the driving element may be a motor or a combination of a motor or a reduction gear set. The valve core 20 is configured to be driven to rotate by the driving element in the driving device 50. In FIG. 1, the valve body 10 further includes a bottom wall portion 12 and a top wall portion 13. The bottom wall portion 12, the top wall portion 13, and the side wall portion 11 enclose to form the valve chamber 101. At least part of the side wall portion 11 protrudes from the top wall portion 13 along an axial direction of the valve body 10, the sealing ring 43 is arranged between the top wall portion 13 and the valve core 20, and at least part of the side wall portion 11 is located between the bottom wall portion 12 and the top wall portion 13. One of the bottom wall portion 12 and the top wall portion 13 is integrally formed with the side wall portion 11, and the other of the bottom wall portion 12 and the top wall portion 13 is arranged to be sealed with the side wall portion 11. For example, in FIG. 1, the top wall portion 13 is integrally formed with the side wall portion 11, and the bottom wall portion 12 may be fixedly connected to and sealed with the side wall portion 11 by means of a welding process to prevent fluid leakage. The sealing ring 43 is arranged between the top wall portion 13 and the valve core 20. In this way, the valve core 20 is assembled from the bottom wall portion 12 of the valve body 10 toward the top wall portion 13 during the assembly process. The control valve 1 has at least five passages 30, one end of each of the at least five passages 30 penetrates the side wall portion 11 and is in communication with the valve chamber 101, and the other end of the passage 30 forms a valve port 102 of the control valve 1, and fluid can enter or leave the control valve 1 through the valve port 102. In some embodiments, the control valve 1 further includes a balance sealing block 42, and the balance sealing block 42 is arranged between the side wall portion 11 and the valve core 20. The balance sealing block 42 and the first seal 41 are respectively arranged on two sides of the valve core 20 in the radial direction of the valve core 20. The balance sealing block 42 cooperates with the first seal 41 to jointly exert forces on the valve core 20, so that the valve core 20 and the side wall portion 11 can be kept coaxial, the rotation stability of the valve core 20 is improved, fluid leakage caused by eccentricity of the valve core 20 is prevented, the sealing performance of the control valve 1 is improved, and the stability of the control valve 1 on fluid control is improved.

In order to facilitate the assembly of the control valve 1 with other components in a fluid control system and improve the integration degree of the control valve 1 and other components, in some embodiments, as shown in FIGS. 1 to 3, the valve body 10 further includes a mounting part 14, the mounting part 14 is fixedly connected to the side wall portion 11 and located on a side of the side wall portion 11 away from the valve chamber 101, for example, the mounting part 14 and the side wall portion 11 may be integrally formed. The mounting part 14 has a mounting surface, the valve port 102 of the control valve 1 penetrates through the mounting surface, so that all the valve ports 102 of the control valve 1 are formed on the mounting surface and the orientations of the valve ports 102 are the same, which can relatively simplify the assembly process of the control valve 1 with other components, reduce leakage points of connecting parts, and improve the reliability of the sealing. In some embodiments, the first seal 41 includes through holes 411 that penetrate through the first seal 41 itself, and the through holes 411 correspond to and are in communication with at least part of the passages 30 of the control valve 1. The first seal 41 is deformed by being pressed by the valve core 20 and the side wall portion 11, so that the control valve 1 is sealed by the first seal 41.

Figure 4:
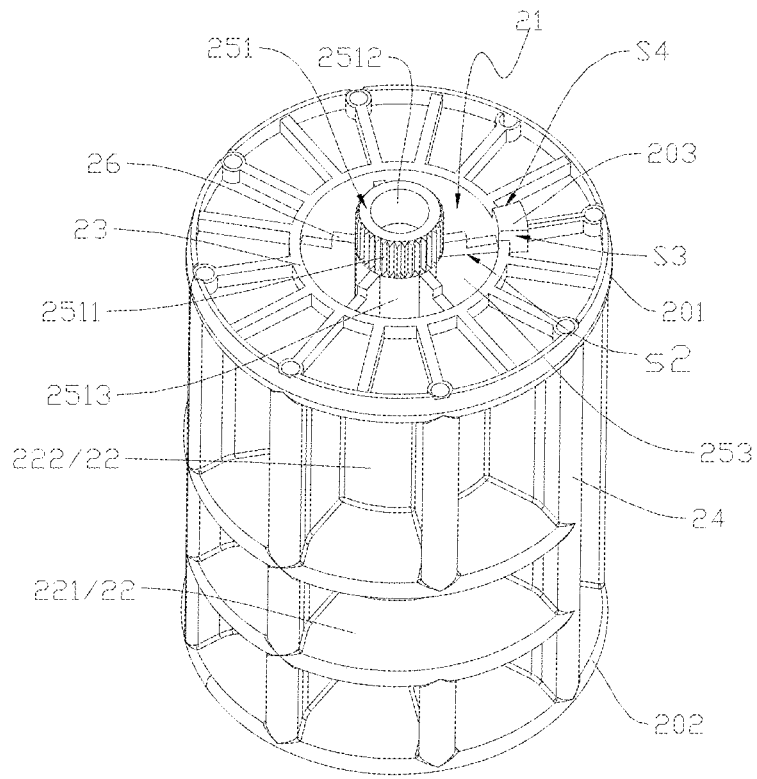
FIG. 4 is a schematic structural view of a valve core according to an embodiment of the present disclosure.
Figure 5:
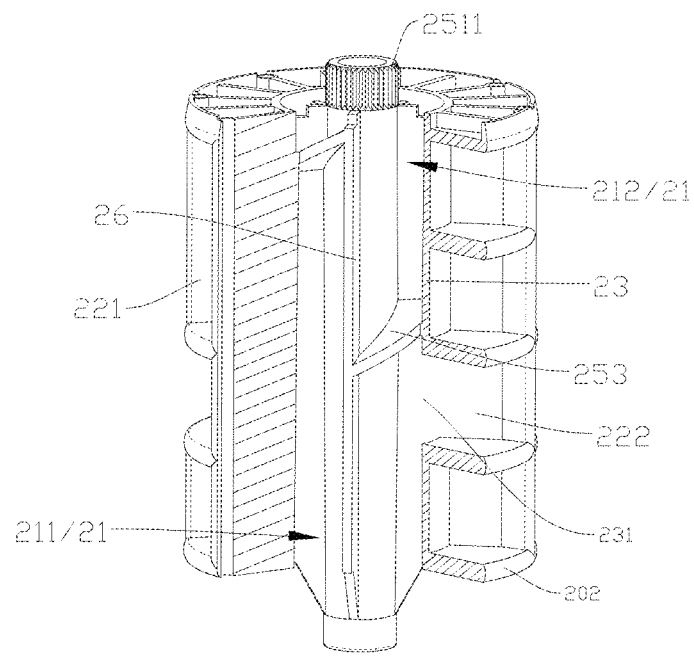
FIG. 5 is a partial cross-sectional view of the valve core shown in FIG. 4.
Figure 6:
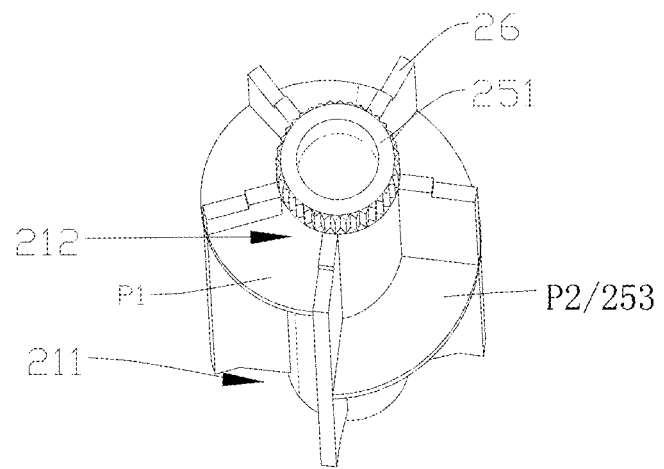
FIG. 6 is a schematic view of a combined structure of a first valve-core shaft, a connecting rib, and a first reinforcing rib in the valve core shown in FIG. 4 from a first perspective.
Figure 7:
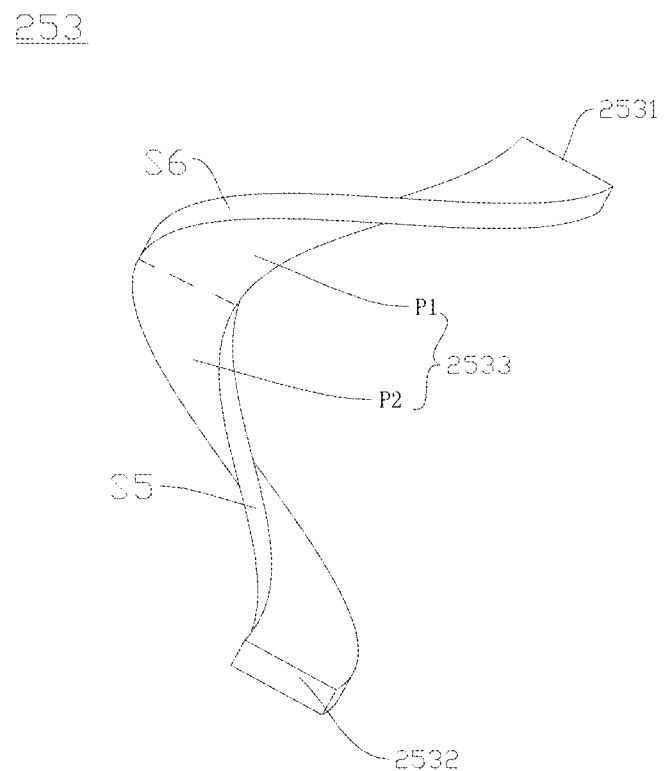
FIG. 7 is a schematic structural view of a first reinforcing rib according to an embodiment of the present disclosure.

As shown in FIGS. 4 to 8, the valve core 20 has outer communication chambers 22 and a first chamber 21. The outer communication chambers 22 extend from a side surface of the valve core 20 toward an interior of the valve core 20, and the outer communication chambers 22 are distributed on an outer peripheral side of the first chamber 21. In an embodiment of the present disclosure, the outer communication chambers 22 can be in communication with and/or cut off corresponding valve ports 102, so that control valve 1 can control fluid in multiple paths. By providing the first chamber 21, thicknesses of the control valve 1 at various positions tend to be the same, preventing deformation of the control valve 1 caused by uneven wall thickness during the manufacturing process of the control valve 1. The valve core 20 includes a first partition 23, a first valve-core shaft 251, and a first reinforcing rib 253. The first partition 23 is located between the outer communication chambers 22 and the first chamber 21. The first valve-core shaft 251 is located on an inner peripheral side of the first partition 23 and a gap is provided between the first valve-core shaft 251 and the first partition 23. The first chamber 21 includes the gap between the first valve-core shaft 251 and the first partition 23, and the first reinforcing rib 253 is located inside the first chamber 21. The first reinforcing rib 253 extends around an axis of the first valve-core shaft 251 and is connected to an outer surface of the first valve-core shaft 251 and an inner surface of the first partition 23, respectively. As shown in FIGS. 6 and 7, the first reinforcing rib 253 includes a first end portion 2531, a second end portion 2532, and a first main body portion 2533. The first main body portion 2533 is connected between the first end portion 2531 and the second end portion 2532, and there is a height difference between the first end portion 2531 and the second end portion 2532 along a height direction of the valve core 20. The first main body portion 2533 includes a first sub-portion P1 and a second sub-portion P2 that are fixedly connected. The first sub-portion P1 is connected to the first end portion 2531, and the second sub-portion P2 is connected to the second end portion 2532. Along the height direction of the valve core 20, an orthographic projection of the first sub-portion P1 and an orthographic projection of the second sub-portion P2 are arranged along a circumferential direction of the first valve-core shaft 251 and do not overlap with each other. By providing the first reinforcing rib 253, on the one hand, the variation of the structural strength of the valve core 20 caused by the arrangement of the outer communication chambers 22 and the first chamber 21 in the control valve 1 can be reduced, and on the other hand, by providing the first reinforcing rib 253, which are in spiral structure, the anti-twist strength of the valve core 20 can be improved, and the twist deformation of the valve core 20 during the rotation can be reduced, thereby alleviating the fluid leakage problem of the control valve 1 caused by the twist deformation, and improving the stability of the operation of the control valve 1. The orthographic projection of the first sub-portion P1 of the first reinforcing rib 253 and the orthographic projection of the second sub-portion P2 of the first reinforcing rib 253 are arranged along the circumferential direction of the first valve-core shaft 251 and do not overlap with each other, so that the integral injection molding of the first reinforcing rib 253, the first partition 23, and the first valve-core shaft 251 can be easily achieved, and facilitate the demolding of the valve core 20 in the manufacturing process can be easily realized. In an embodiment, the valve core 20 further includes a second partition 24, and the second partition 24 is located between two adjacent outer communication chambers 22. The second partition 24 separates each of the outer communication chambers 22 into an independent space. Herein, the axial direction and the height direction of the valve body 10, the axial direction and the height direction of the valve core 20 are all in parallel or coincident.

Further referring to FIGS. 2 to 6, in some embodiments, the first reinforcing rib 253 spirally surrounds the first valve-core shaft 251 for a full circle, that is, an orthographic projection of an end face of the first end portion 2531 coincides with an orthographic projection of an end face of the second end portion 2532 along an axial direction of the valve core. The first chamber 21 includes a first sub-chamber 211 and a second sub-chamber 212 along the height direction of the valve core 20, and the first sub-chamber 211 and the second sub-chamber 212 are respectively arranged on two sides of the first reinforcing rib 253 along the height direction of the valve core 20. The first sub-chamber 211 and the second sub-chamber 212 are separated into independent spaces by the first reinforcing rib 253. The first partition 23 has a communication hole 231 at a chamber wall forming the first sub-chamber 211, and the first sub-chamber 211 is in communication with part of the outer communication chambers 22 through the communication hole 231, and a number of the valve ports 102 are in communication with the first sub-chamber 211 through the valve chamber 101, so that control valve 1 realizes communication and/or cut-off between the two valve ports through the valve chamber, the first sub-chamber 211, the communication hole 231 and the outer communication chamber 22.

As shown in FIGS. 1 and 2, the passages 30 of the control valve 1 can further include multiple first flow passages 31, one end of each of the multiple first flow passages 31 penetrates through the side wall portion 11 to form a first communication port 311, and the other end of the first flow passage 31 forms a first valve port 312. Along a height direction of the side wall portion 11, the position of the first communication port 311 corresponds to the position of the outer communication chamber 22, facilitating the flow of fluid between the outer communication chamber 22 and the first communication port 311. The outer communication chambers 22 of the valve core include multiple first chambers 221 and multiple second chambers 222. Along the height direction of the valve core 20, a longitudinal cross-sectional area of a chamber opening of each of the multiple first chambers 221 is greater than or equal to twice a longitudinal cross-sectional area of a chamber opening of each of the multiple second chambers 222. The first chamber 221 can correspond to two first valve ports 312, and the second chamber 222 corresponds to one first valve port 312. The two second valve ports 322 corresponding to the first chamber 221 can be in communication and/or cut off with each other through one first chamber 221 and the first communication port 311 by rotating the valve core 20, and some of the second chambers 222 are in communication with the first sub-chamber 211 of the first chamber 21 through the communication hole 231. The first valve port 312 can be in communication and/or cut off with the valve port 102 corresponding to the second chamber 222 through the first chamber 21, the communication hole 231, and the second chamber 222 by rotating the valve core 20. The longitudinal cross-sectional area of each of the communication chambers (i.e., the first chamber 221 or the second chamber 222) is a cross-sectional area parallel to the axial direction of the valve core, which is obtained by cutting the valve core along edges of the peripheral wall on both sides of the communication chamber. The cross-sectional area may also be understood as an area of a projection surface of the orthographic projection of the communication chamber along the radial direction, or the cross-sectional area may also be understood as the area of the chamber opening, which faces the second valve port 322, of the communication chamber.

Further referring to FIGS. 1 and 3, the passages 30 of the control valve 1 may include a second flow passage 32, one end of the second flow passage 32 penetrates through the side wall portion 11 to form a second communication port 321, and the other end of the second flow passage 32 forms a second valve port 322. The second communication port 321 is located at an end of the side wall portion 11 in the height direction of the side wall portion 11, and as shown in FIG. 3, the second communication port 321 is located in an area between an end of the first seal 41 and the bottom wall portion 12. In any operation mode of the valve core 20, the second valve port 322 is always in communication with the first sub-chamber 211 of the first chamber 21 through the second communication port 321, the valve chamber 101, that is, at any rotation angle of the valve core 20, the fluid flowing into the control valve from the second valve port 322 directly enters the valve chamber 101 through the second communication port 321, flows into the first sub-chamber 211 from the valve chamber 101, and flows between the first sub-chamber 211 and the outer communication chambers 22 through the communication hole 231.

In order to improve the strength of the valve core 20, as shown in FIGS. 4 and 5, in some embodiments, the valve core 20 further includes multiple connecting ribs 26, the multiple connecting ribs 26 are arranged in the first chamber 21 along the circumferential direction of the first valve-core shaft 251. Each of the multiple connecting ribs 26 is connected to the inner surface of the first partition 23 and the outer surface of the first valve-core shaft 251, and the first reinforcing rib 253 is inserted into the connecting rib 26 and connected to the connecting rib 26. Optionally, the first partition 23, the first valve-core shaft 251, the first reinforcing rib 253 and the connecting ribs 26 may be integrally formed by injection molding. As shown in FIG. 6, in the case that the valve core 20 includes the connecting ribs 26, the first end portion 2531 of the first reinforcing rib 253 is connected to one side surface of one of the connecting ribs 26, and the second end portion 2532 is connected to the other side surface of the connecting rib 26, so that the first reinforcing rib 253 surrounds the first valve-core shaft 251 in a full circle. Alternatively, a plane where the end face of the first end portion 2531 of the first reinforcing rib 253 is located can coincides with a plane where the end face of the second end portion 2532 is located.

Figure 8:
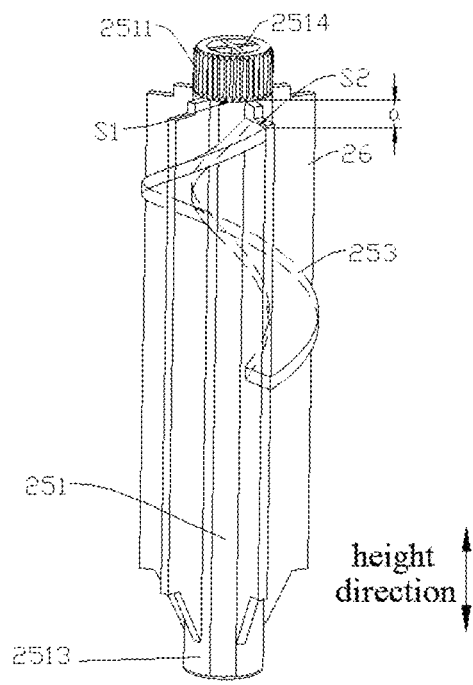
FIG. 8 is a schematic view of a combined structure of a first valve-core shaft, a connecting rib, and a first reinforcing rib in the valve core shown in FIG. 4 from a second perspective.
Figure 9:
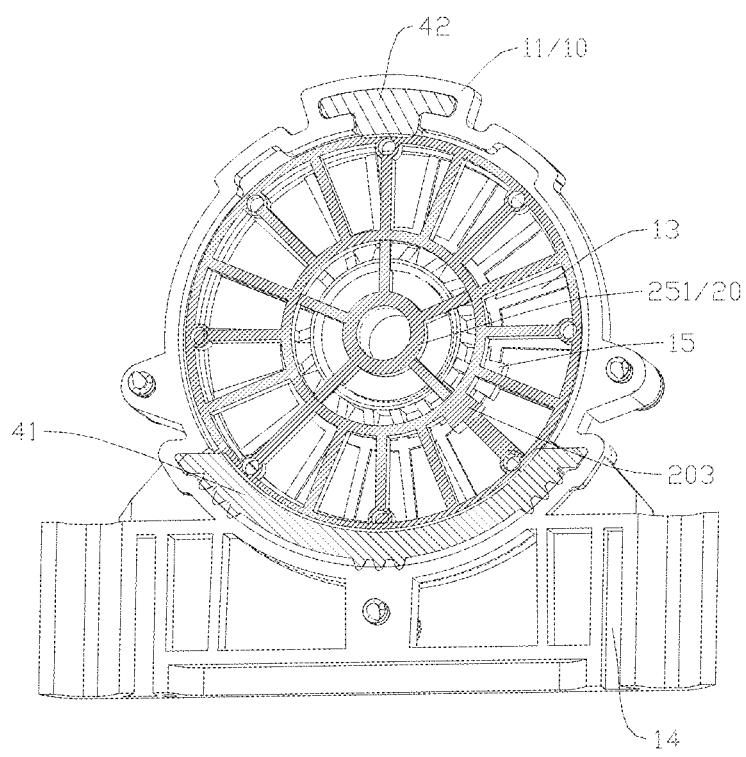
FIG. 9 is a cross-sectional view of the control valve shown in FIG. 1 at a third position.
Figure 10:
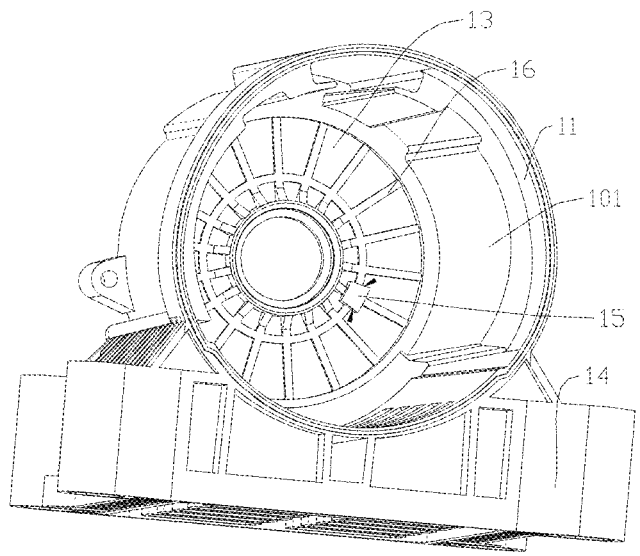
FIG. 10 is a schematic view of a partial structure of a valve body according to an embodiment of the present disclosure.

Further referring to FIGS. 5 and 8, in some embodiments, the first valve-core shaft 251 includes a transmission connection portion 2511 and a cylindrical portion 2513 that are fixedly connected. The transmission connection portion 2511 and the cylindrical portion 2513 are arranged along a height direction of the first valve-core shaft 251. The valve core 20 is in transmission connection with the driving device of the control valve 1 through the transmission connection portion 2511, so that the driving device drives the valve core 20 to rotate. Herein, at least part of the cylindrical portion 2513 is arranged in the first chamber 21, and at least part of the transmission connection portion 2511 is arranged outside the first chamber 21. The outer surface of the transmission connection portion 2511 may be in a tooth-shaped structure, and the tooth-shaped structure is engaged with a tooth-shaped structure in the driving device. Specifically, as shown in FIG. 8, the tooth-shaped structure in the driving device may be sleeved from top to bottom on an outer surface of the transmission connection portion 2511. During the rotation, there is a relatively large stress at an end face position where the driving device is connected to the transmission connection portion 2511, the transmission connection portion 2511 has a stress concentration surface S1 adjacent to the cylindrical portion 2513, and the first reinforcing rib 253 has a first edge S2 adjacent to the transmission connection portion 2511. Along the height direction of the first valve-core shaft 251, the first edge S2 is lower than the stress concentration surface S1 or coincides with a plane where the stress concentration surface S1 is located. A distance between the first edge S2 and the stress concentration surface S1 is defined as a, and a is less than or equal to 10 mm. With the above configuration, the first reinforcing rib 253 can effectively improve the anti-twist strength of the valve core 20 during the rotation.

Figure 11:
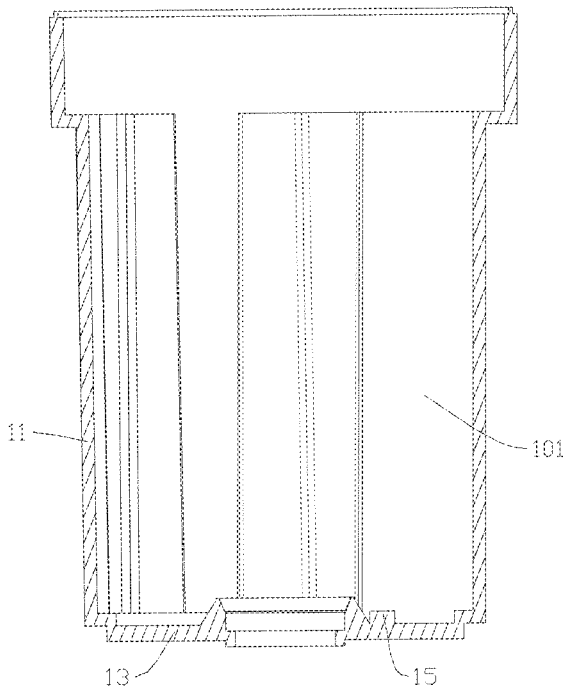
FIG. 11 is a cross-sectional view of the valve body shown in FIG. 10.

As shown in FIGS. 4, 8, and 11, in some embodiments, the valve body 10 further includes a top wall portion 13 located at an end of the side wall portion 11 and a first block 15 fixedly connected to the top wall portion 13. The top wall portion 13 and the side wall portion 11 are fixedly connected to form an integral structure. Optionally, the top wall portion 13 and the side wall portion 11 may be integrally formed by injection molding, and the first block 15 protrudes from the top wall portion 13 and is located in the valve chamber 101. The valve core 20 includes a top plate 201, a bottom plate 202 spaced from each other, and a second block 203. The top plate 201 and the bottom plate 202 are arranged along the height direction of the valve core 20, and the outer communication chambers 22 are located between the top plate 201 and the bottom plate 202. The second block 203 is located on a side of the top plate 201 away from the bottom plate 202. The first block 15 is configured to abut against the second block 203 and stop the valve core 20 from continuing to move towards the first block 15 when the valve core 20 rotates to a predetermined position. The first edge S2 of the first reinforcing rib 253 is arranged adjacent to the second block 203 along a circumferential direction of the valve core 20.

Further referring to FIG. 4, in some embodiments, the second block 203 includes a first stop surface S3 and a second stop surface S4 along the circumferential direction of the valve core 20. Along the circumferential direction of the valve core 20, the first edge S2 of the first reinforcing rib 253 is located between the first stop surface S3 and the second stop surface S4, and a distance between the first stop surface S3 and the first edge S2 is equal to a distance between the second stop surface S4 and the first edge S2. In that case, along the height direction of the valve core 20, an orthographic projection of the first edge S2 is located within a fan-shaped area formed by an inner surface of the second block 203 facing a central axis of the valve core and a circle center of the valve core 20 and located at a central position of the area, which can effectively improve the anti-twist strength of the valve core 20 when the first block 15 abuts against the first stop surface S3 or the first block 15 abuts against the second stop surface S4.

Figure 12:
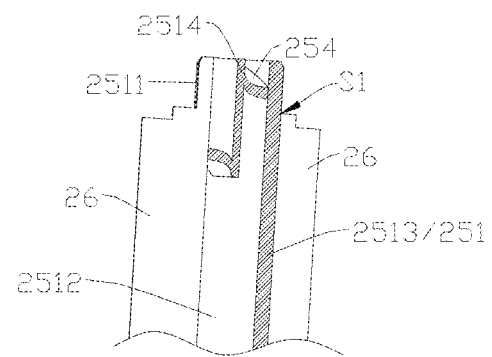
FIG. 12 is a partial cross-sectional view of a combined structure of a first valve-core shaft, a connecting rib, and a second reinforcing rib in a valve core according to another embodiment of the present disclosure.
Figure 13:
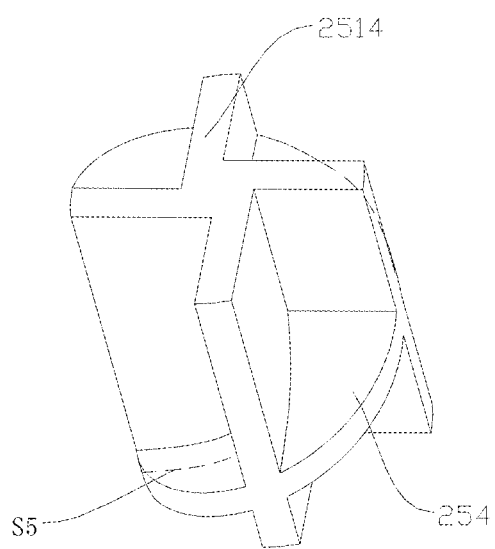
FIG. 13 is a schematic view of a combined structure of a second reinforcing rib and a first connecting plate.

As shown in FIGS. 12 and 13, in some embodiments, the first valve-core shaft 251 has a second chamber 2512, and the second chamber 2512 penetrates through at least part of the first valve-core shaft 251. The valve core 20 further includes a second reinforcing rib 254 and a first connecting plate 2514. The first connecting plate 2514 is arranged in the second chamber 2512 and is fixedly connected to an inner surface of the first valve-core shaft 251. As shown in FIG. 13, the first connecting plate 2514 in in a cross-shaped structure, the second reinforcing rib 254 is located in the second chamber 2512 and fixedly connected to the inner surface of the first valve-core shaft 251, and the structure of the second reinforcing rib 254 is similar to the structure of the first reinforcing rib 253. Optionally, the second reinforcing rib 254 extends around the axis of the first valve-core shaft 251, and the second reinforcing rib 251 includes a third end portion, a fourth end portion, and a second main body portion. The second main body portion is connected between the third end portion and the fourth end portion, and there is a height difference between the third end portion and the fourth end portion along the height direction of the valve core. The second main body portion includes a third sub-portion and a fourth sub-portion that are fixedly connected, the third sub-portion is connected to the third end portion, and the fourth sub-portion is connected to the fourth end portion. Along the height direction of the valve core, an orthographic projection of the third sub-portion and an orthographic projection of the fourth sub-portion are arranged along the circumferential direction of the first valve-core shaft 251 and do not overlap with each other, and the second reinforcing rib 251 is in a spiral structure. With the above configuration, besides the anti-twist strength of the valve core can be improved, the integral injection molding of the second reinforcing rib 254 and the first valve-core shaft 251 can be easily realized. The second reinforcing rib 254 extends around the first connecting plate 2514 in less than a full circle or in a full circle, facilitating of demolding during the manufacturing process of the valve core.

Further referring to FIGS. 8, 12, and 13, in some embodiments, the first valve-core shaft 251 includes a transmission connection portion 2511 and a cylindrical portion 2513 that are fixed connected. The transmission connection portion 2511 and the cylindrical portion 2513 are arranged along the height direction of the first valve-core shaft 251, the transmission connection portion 2511 has a stress concentration surface S1 adjacent to the cylindrical portion 2513, and the second reinforcing rib 254 has a second edge S5 adjacent to the transmission connection portion 2511. Along the height direction of the first valve-core shaft 251, the second edge S5 is higher than the stress concentration surface S1 or lower than the stress concentration surface S1 or coincides with a plane where the stress concentration surface S1 is located, and a distance between the second edge S5 and the stress concentration surface S1 is less than or equal to 10 mm. Optionally, the second reinforcing rib 254 may be arranged in an area corresponding to the transmission connection portion 2511, that is, the second reinforcing rib 254 may be arranged in a chamber enclosed by an inner surface of the transmission connection portion 2511. The second reinforcing rib 254 may extend spirally from a top end face of the transmission connection portion 2511 to be flush with the stress concentration surface S1 (a bottom end face of the transmission connection portion 2511) of the transmission connection portion 2511, or higher than the stress concentration surface S1 or lower than the stress concentration surface S1, so as to improve the anti-twist strength of the valve core 20.

Figure 14:
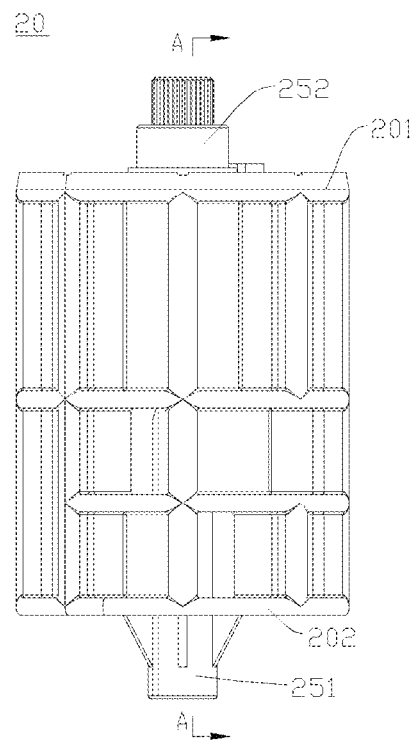
FIG. 14 a schematic front view of a valve core according to another embodiment of the present disclosure.
Figure 15:
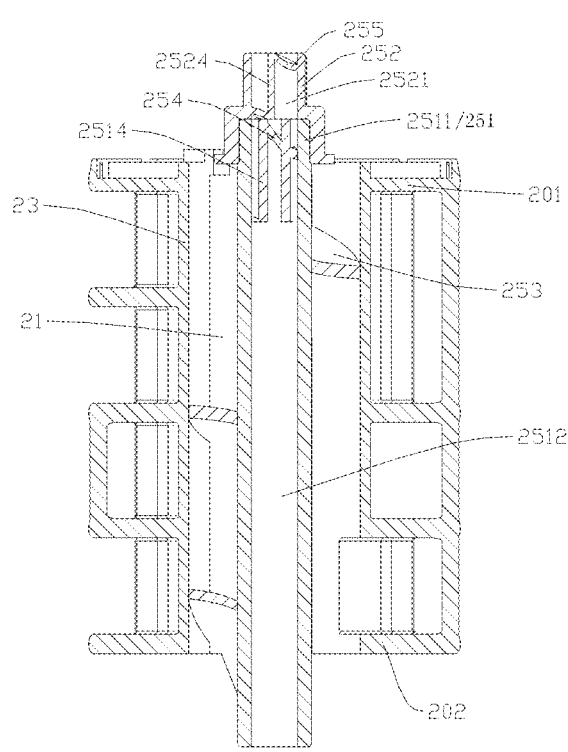
FIG. 15 is a schematic cross-sectional view of the valve core shown in FIG. 14 along direction A-A.
Figure 16:
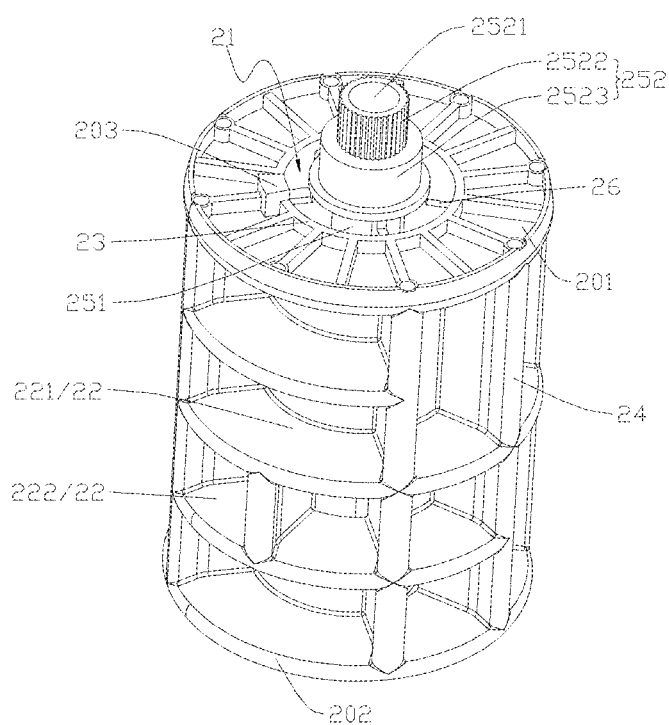
FIG. 16 is a schematic structural view of the valve core shown in FIG. 14 from another perspective.
Figure 17:
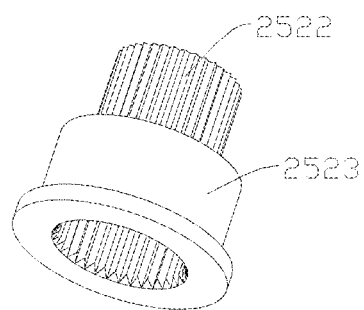
FIG. 17 is a schematic structural view of a second valve-core shaft according to an embodiment of the present disclosure.
Figure 18:
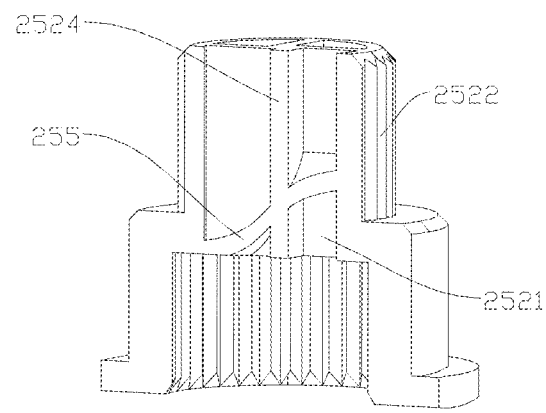
FIG. 18 is a cross-sectional view of a combined structure of a second valve-core shaft, a second connecting plate, and a third reinforcing rib according to an embodiment of the present disclosure.
Figure 19:
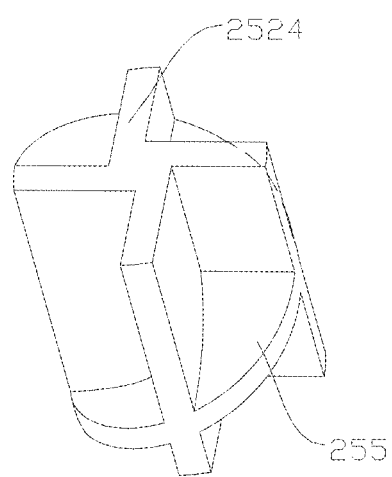
FIG. 19 is a schematic view of a combined structure of the second connecting plate and the third reinforcing rib shown in FIG. 18.

In the case that the first valve-core shaft 251 includes a transmission connection portion 2511, the transmission connection portion 2511 may be in a tooth-shaped structure. Based on this, in order to improve the structural strength of the valve core 20, as shown in FIGS. 1, 14, and 19, the valve core 20 may further include a second valve-core shaft 252, the second valve-core shaft 252 is in transmission connection with the driving device 50, so that the driving device 50 can drive the valve core 20 to rotate. The first valve-core shaft 251 is in transmission connection with the second valve-core shaft 252 through the transmission connection portion 2511, and the second valve-core shaft 252 has a third chamber 2521. The control valve 1 further includes a third reinforcing rib 255 and a second connecting plate 2524. The second connecting plate 2524 is located within the third chamber 2521 and fixedly connected to an inner surface of the second valve-core shaft 252. As shown in FIG. 19, the second connecting plate 2524 may be in a cross-shaped structure, the third reinforcing rib 255 is located within the third chamber 2521 and fixedly connected to the inner surface of the second valve-core shaft 252, and the structure of the third reinforcing rib 255 is similar to the structure of the first reinforcing rib 253. Optionally, the third reinforcing rib 255 extends around the axis of the second valve-core shaft 252. The third reinforcing rib 255 includes a fifth end portion, a sixth end portion, and a third main body portion. The third main body portion is connected between the fifth end portion and the sixth end portion, and there is a height difference between the fifth end portion and the sixth end portion along the height direction of the valve core. The third main body portion includes a fifth sub-portion and a sixth sub-portion that are fixedly connected, the fifth sub-portion is connected to the fifth end portion, and the sixth sub-portion is connected to the sixth end portion. Along the height direction of the valve core, an orthographic projection of the fifth sub-portion and an orthographic projection of the sixth sub-portion are arranged along the circumferential direction of the second valve-core shaft 252 and do not overlap with each other. With the above configuration, the anti-twist strength of the second valve-core shaft 252 is improved, and the integral injection molding of the third reinforcing rib 255, the second valve-core shaft 252, and the second connecting plate 2524 can be easily realized. The third reinforcing rib 255 extends around the second connecting plate 2524 in less than a full circle or in a full circle, which facilitates of manufacturing and demolding.

In order to improve the strength of the valve core 20, in some embodiments, the strength of the second valve-core shaft 252 is greater than the strength of the first valve-core shaft 251, and the linear expansion coefficient of the second valve-core shaft 252 is relatively good, so that the control valve can be adapted to environments with various temperatures and the applicability of the control valve 1 is improved. The inner surface of the second valve-core shaft 252 is in a tooth-shaped structure, and the second valve-core shaft 252 is in clearance fit with and in transmission connection with the transmission connection portion 2511 of the first valve-core shaft 251 by the tooth-shaped structure, so that the first spool shaft 251 and the second spool shaft 252 rotate synchronously. Optionally, a constituent material of the first valve-core shaft 251 may be a combination of polyamide-66 (PA66) and glass fiber (GF), or a combination of polyphthalamide (PPA) and glass fiber (GF), or polyphenylene sulfide (PPS). A constituent material of the second valve-core shaft 252 may be selected from one of metal and polyphenylene sulfide (PPS) or their combination. In some embodiments, the control valve 1 may not be provided with the second valve-core shaft 252, and may be in transmission connection with the driving device through the first valve-core shaft 251, so that the driving device can drive the valve core to rotate.

In summary, in the control valve 1 according to the embodiments of the present disclosure, the control valve 1 has outer communication chambers 22 and the first chamber 21, the outer communication chambers 22 is configured to be in communication with and/or cut off the corresponding valve ports 102, so that the control valve 1 can control the fluid in multiple paths. By providing the first chamber 21, the thicknesses of the control valve 1 at various positions tend to be the same, so as to prevent deformation caused by uneven wall thickness of the control valve 1 during the manufacturing process. The control valve 1 according to the embodiments of the present disclosure further includes the first reinforcing rib 253 located in the first chamber 21, which can improve the strength of the control valve 1, improve the anti-twist strength of the valve core 20, reduce the twist deformation of the valve core 20 during the rotation, thereby alleviating the fluid leakage problem of the control valve 1 caused by the twist deformation, and improving the stability of the operation of the control valve 1. The orthographic projection of the first sub-portion 2531 of the first reinforcing rib 253 and the orthographic projection of the second sub-portion 2532 of the first reinforcing rib 253 are arranged along the circumferential direction of the first valve-core shaft 251 and do not overlap with each other, and the first reinforcing rib 253 is in a spiral structure, so that the anti-twist strength of the valve core 20 can be improved, the twist deformation of the valve core 20 during the rotation can be reduced, thereby alleviating the fluid leakage problem of the control valve caused by twist deformation, and improving the stability of the operation of the control valve 20, and, with the above configuration, the valve core 20 can be easily demolded during the manufacturing process.

It should be noted that the above embodiments are only used to illustrate the present disclosure and not to limit the technical solutions described in the present disclosure, For example, definitions for directions such as "front", "back", "left", "right", "up", "down". Although this specification has described the present disclosure in detail with reference to the above embodiments, it should be understood that those skilled in the art can still modify, combine or replace the present disclosure, all technical solutions and improvements thereof that do not deviate from the spirit and the scope of the present disclosure shall fall within the scope of the claims of the present disclosure.

The invention claimed is:

1. A control valve, comprising a valve body and a valve core, wherein
the valve body comprises a side wall portion, the control valve has a valve chamber, the side wall portion forms at least part of a peripheral wall of the valve chamber, the valve core is configured to be driven to rotate and at least part of the valve core is arranged in the valve chamber, the valve core has outer communication chambers and a first chamber, the outer communication chambers are distributed on an outer peripheral side of the first chamber, the valve core comprises a first partition and a first valve-core shaft, the first partition is located between the outer communication chambers and the first chamber, the first valve-core shaft is located on an inner peripheral side of the first partition and a gap is provided between the first valve-core shaft and the first partition, the first chamber comprises the gap between the first valve-core shaft and the first partition, and the control valve further comprises a first reinforcing rib, and the first reinforcing rib is located in the first chamber; and wherein the first reinforcing rib extends around an axis of the first valve-core shaft, the first reinforcing rib comprises a first end portion, a second end portion, and a first main body portion, the first main body portion is connected between the first end portion and the second end portion, and there is a height difference between the first end portion and the second end portion along a height direction of the valve core.

2. The control valve according to claim 1, wherein the first main body portion comprises a first sub-portion and a second sub-portion that are fixedly connected, the first sub-portion is connected to the first end portion, the second sub-portion is connected to the second end portion, and along the height direction of the valve core, an orthographic projection of the first sub-portion and an orthographic projection of the second sub-portion are arranged along a circumferential direction of the first valve-core shaft and do not overlap with each other.

3. The control valve according to claim 1, wherein
the first valve-core shaft comprises a transmission connection portion and a cylindrical portion that are fixedly connected, the transmission connection portion and the cylindrical portion are arranged along a height direction of the first valve-core shaft, at least part of the cylindrical portion is arranged in the first chamber, at least part of the transmission connection portion is arranged outside the first chamber, and an outer surface of the transmission connection portion is in shape of tooth, the transmission connection portion has a stress concentration surface adjacent to the cylindrical portion, and the first reinforcing rib has a first edge adjacent to the transmission connection portion; and wherein, along the height direction of the first valve-core shaft, the first edge is lower than the stress concentration surface or coincides with a plane where the stress concentration surface is located, and a distance between the first edge and the stress concentration surface is less than or equal to 10 mm.

4. The control valve according to claim 3, wherein
the valve body further comprises a top wall portion and a first block, the top wall portion and the side wall portion are fixedly connected to form an integral structure, at least part of the side wall portion protrudes from the top wall portion along an axial direction of the valve body, the first block is fixedly connected to the top wall portion, and the first block protrudes from the top wall portion and is located in the valve chamber; and wherein the valve core comprises a top plate and a bottom plate spaced apart from each other, and a second block, the top plate and the bottom plate are arranged along the height direction of the valve core, and the outer communication chambers are located between the top plate and the bottom plate, the second block is located on a side of the top plate away from the bottom plate, and the first block is configured to abut against the second block and restrict the valve core from continuing to move towards the first block when the valve core rotates to a predetermined position.

5. The control valve according to claim 4, wherein the first edge of the first reinforcing rib is arranged adjacent to the second block along a circumferential direction of the valve core.

6. The control valve according to claim 4, wherein the second block comprises a first stop surface and a second stop surface along a circumferential direction of the valve core; and wherein, along the circumferential direction of the valve core, the first edge is arranged between the first stop surface and the second stop surface, and a distance between the first edge and the first stop surface is equal to a distance between the first edge and the second stop surface.

7. The control valve according to claim 1, wherein
the valve core further comprises a plurality of connecting ribs, the plurality of connecting ribs are arranged along a circumferential direction of the first valve-core shaft, and at least part of the plurality of connecting ribs are located in the first chamber, the plurality of connecting ribs are connected to an inner surface of the first partition and an outer surface of the first valve-core shaft, respectively, and the first reinforcing rib is inserted into the plurality of connecting ribs; and wherein the first partition, the first valve-core shaft, the first reinforcing rib, and the plurality of connecting ribs are integrally formed by injection molding.

8. The control valve according to claim 1, wherein
the first valve-core shaft has a second chamber, the valve core further comprises a second reinforcing rib, the second reinforcing rib is arranged in the second chamber and fixedly connected to an inner surface of the first valve-core shaft; and wherein the second reinforcing rib extends around the axis of the first valve-core shaft, the second reinforcing rib comprises a third end portion, a fourth end portion, and a second main body portion, the second main body portion is connected between the third end portion and the fourth end portion, and there is a height difference between the third end portion and the fourth end portion along the height direction of the valve core.

9. The control valve according to claim 8, wherein the second main body portion comprises a third sub-portion and a fourth sub-portion that are fixedly connected, the third sub-portion is connected to the third end portion, the fourth sub-portion is connected to the fourth end portion, and, along the height direction of the valve core, an orthographic projection of the third sub-portion and an orthographic projection of the fourth sub-portion are arranged along a circumferential direction of the first valve-core shaft and do not overlap with each other.

10. The control valve according to claim 9, wherein the first valve-core shaft comprises a transmission connection portion, the control valve further comprises a second valve-core shaft and a driving device, the driving device is configured to drive the valve core to rotate, the second valve-core shaft is in transmission connection with the driving device, and the second valve-core shaft is in transmission connection with the first valve-core shaft through the transmission connection portion;

wherein the second valve-core shaft has a third chamber, and the control valve further comprises a third reinforcing rib, the third reinforcing rib is arranged in the third chamber and fixedly connected to an inner surface of the second valve-core shaft; and wherein the third reinforcing rib extends around an axis of the second valve-core shaft, the third reinforcing rib comprises a fifth end portion, a sixth end portion, and a third main body portion, the third main body portion is connected between the fifth end portion and the sixth end portion, and there is a height difference between the fifth end portion and the sixth end portion along the height direction of the valve core.

11. The control valve according to claim 9, wherein the control valve has at least five passages, one end of each of the at least five passages penetrates the side wall portion and is in communication with the valve chamber, the other end of the passage forms a valve port of the control valve, and the valve core further comprises a plurality of connecting ribs; and wherein a first end portion of the first reinforcing rib is connected to one side surface of one of the plurality of connecting ribs, and a second end portion of the first reinforcing rib is connected to the other side surface of the connecting rib, the first chamber comprises a first sub-chamber and a second sub-chamber, and the first sub-chamber and the second sub-chamber are respectively arranged on both sides of the first reinforcing rib along the height direction of the valve core, the first sub-chamber and the second sub-chamber are separated into independent spaces by the first reinforcing rib, and a communication hole is formed in a chamber wall of the first partition that forms the first sub-chamber, the first sub-chamber is in communication with some of the outer communication chambers through the communication hole, and some of the valve ports are in communication with the first sub-chamber through the valve chamber.

12. The control valve according to claim 8, wherein the first valve-core shaft comprises a transmission connection portion and a cylindrical portion that are fixedly connected, the transmission connection portion and the cylindrical portion are arranged along a height direction of the first valve-core shaft, the transmission connection portion has a stress concentration surface adjacent to the cylindrical portion, and the second reinforcing rib has a second edge adjacent to the transmission connection portion; and wherein, along the height direction of the first valve-core shaft, a distance between the second edge and the stress concentration surface is less than or equal to 10 mm.

13. The control valve according to claim 12, wherein the first valve-core shaft comprises a transmission connection portion, the control valve further comprises a second valve-core shaft and a driving device, the driving device is configured to drive the valve core to rotate, the second valve-core shaft is in transmission connection with the driving device, and the second valve-core shaft is in transmission connection with the first valve-core shaft through the transmission connection portion;

wherein the second valve-core shaft has a third chamber, and the control valve further comprises a third reinforcing rib, the third reinforcing rib is arranged in the third chamber and fixedly connected to an inner surface of the second valve-core shaft; and wherein the third reinforcing rib extends around an axis of the second valve-core shaft, the third reinforcing rib comprises a fifth end portion, a sixth end portion, and a third main body portion, the third main body portion is connected between the fifth end portion and the sixth end portion, and there is a height difference between the fifth end portion and the sixth end portion along the height direction of the valve core.

14. The control valve according to any claim 12, wherein the control valve has at least five passages, one end of each of the at least five passages penetrates the side wall portion and is in communication with the valve chamber, the other end of the passage forms a valve port of the control valve, and the valve core further comprises a plurality of connecting ribs; and wherein a first end portion of the first reinforcing rib is connected to one side surface of one of the plurality of connecting ribs, and a second end portion of the first reinforcing rib is connected to the other side surface of the connecting rib, the first chamber comprises a first sub-chamber and a second sub-chamber, and the first sub-chamber and the second sub-chamber are respectively arranged on both sides of the first reinforcing rib along the height direction of the valve core, the first sub-chamber and the second sub-chamber are separated into independent spaces by the first reinforcing rib, and a communication hole is formed in a chamber wall of the first partition that forms the first sub-chamber, the first sub-chamber is in communication with some of the outer communication chambers through the communication hole, and some of the valve ports are in communication with the first sub-chamber through the valve chamber.

15. The control valve according to claim 1, and 12, wherein the first valve-core shaft comprises a transmission connection portion, the control valve further comprises a second valve-core shaft and a driving device, the driving device is configured to drive the valve core to rotate, the second valve-core shaft is in transmission connection with the driving device, and the second valve-core shaft is in transmission connection with the first valve-core shaft through the transmission connection portion;

wherein the second valve-core shaft has a third chamber, and the control valve further comprises a third reinforcing rib, the third reinforcing rib is arranged in the third chamber and fixedly connected to an inner surface of the second valve-core shaft; and wherein the third reinforcing rib extends around an axis of the second valve-core shaft, the third reinforcing rib comprises a fifth end portion, a sixth end portion, and a third main body portion, the third main body portion is connected between the fifth end portion and the sixth end portion, and there is a height difference between the fifth end portion and the sixth end portion along the height direction of the valve core.

16. The control valve according to claim 15, wherein the third main body comprises a fifth sub-portion and a sixth sub-portion that are fixed connected, the fifth sub-portion is connected to the fifth end portion, and the sixth sub-portion is connected to the sixth end portion, and, along the height direction of the valve core, an orthographic projection of the fifth sub-portion and an orthographic projection of the sixth sub-portion are arranged along the circumferential direction of the second valve-core shaft and do not overlap with each other.

17. The control valve according to claim 16, wherein the control valve has at least five passages, one end of each of the at least five passages penetrates the side wall portion and is in communication with the valve chamber, the other end of the passage forms a valve port of the control valve, and the valve core further comprises a plurality of connecting ribs; and wherein a first end portion of the first reinforcing rib is connected to one side surface of one of the plurality of connecting ribs, and a second end portion of the first reinforcing rib is connected to the other side surface of the connecting rib, the first chamber comprises a first sub-chamber and a second sub-chamber, and the first sub-chamber and the second sub-chamber are respectively arranged on both sides of the first reinforcing rib along the height direction of the valve core, the first sub-chamber and the second sub-chamber are separated into independent spaces by the first reinforcing rib, and a communication hole is formed in a chamber wall of the first partition that forms the first sub-chamber, the first sub-chamber is in communication with some of the outer communication chambers through the communication hole, and some of the valve ports are in communication with the first sub-chamber through the valve chamber.

18. The control valve according to claim 15, wherein a constituent material of the first valve-core shaft is selected from a combination of polyamide-66 and glass fiber, a combination of polyphthalamide and glass fiber, and polyphenylene sulfide, and a constituent material of the second valve-core shaft is selected from metal and polyphenylene sulfide or their combination.

19. The control valve according to claim 18, wherein the first valve-core shaft, the first partition and the first reinforcing rib are integrally formed by injection molding, the inner surface of the second valve-core shaft is in shape of tooth, and the second valve-core shaft is in clearance fit with the transmission connection portion of the first valve-core shaft and is in transmission connection with the transmission connection portion of the first valve-core shaft through the tooth-shaped structure.

20. The control valve according to claim 1, wherein the control valve has at least five passages, one end of each of the at least five passages penetrates the side wall portion and is in communication with the valve chamber, the other end of the passage forms a valve port of the control valve, and the valve core further comprises a plurality of connecting ribs; and wherein a first end portion of the first reinforcing rib is connected to one side surface of one of the plurality of connecting ribs, and a second end portion of the first reinforcing rib is connected to the other side surface of the connecting rib, the first chamber comprises a first sub-chamber and a second sub-chamber, and the first sub-chamber and the second sub-chamber are respectively arranged on both sides of the first reinforcing rib along the height direction of the valve core, the first sub-chamber and the second sub-chamber are separated into independent spaces by the first reinforcing rib, and a communication hole is formed in a chamber wall of the first partition that forms the first sub-chamber, the first sub-chamber is in communication with some of the outer communication chambers through the communication hole, and some of the valve ports are in communication with the first sub-chamber through the valve chamber.

\* \* \* \* \*